United States Defensive Publication [19] (H) [11] T980,003

Brackman [43] Mar. 6, 1979

[54] POLYOLEFIN COMPOSITIONS CONTAINING CALCIUM CARBONATE

[75] Inventor: Derek S. Brackman, Edgware, England

[73] Assignee: Imperial Chemical Industries Limited, London, England

[21] Appl. No.: 885,345

[22] Filed: Mar. 10, 1978

[30] Foreign Application Priority Data

Mar. 28, 1977 [GB] United Kingdom ..... 12914/77

[51] Int. Cl.[2] ..... C08K 3/26

[52] U.S. Cl. ..... 260/42.37; 260/42.46

[57] ABSTRACT

Polyolefin compositions filled with from 10 to 85% by weight of particulate (preferably coccolithic) calcium carbonate have less adversely affected impact strengths if the weight mean particle diameter of the calcium carbonate is from 1.40 to 1.90 μ. The calcium carbonate is preferably coccolithic. The preferred polyolefins are copolymers of propylene with 10 to 20% by weight of ethylene. The composition may also contain from 2 to 15% calculated on the weight of the calcium carbonate, of fiberous vegetable matter.

The filled compositions are useful for conversion into press-formable sheet, for example, having a thickness of 0.5 to 2 mm, which may be melt bonded to a textile cloth and thermoformed into an article such as a piece of motor vehicle trim. The large amounts of filler in the composition allow freshly formed hot sheets to be conveniently laminated to woven or non-woven natural synthetic cloths without the use of adhesives.

8 Claims, No Sheets Drawing,

8 Pages Specification

The file of this unexamined application may be inspected and copies thereof may be purchased (849 O.G. 1221, Apr. 9, 1968).